US012780281B2

(12) United States Patent
Gao et al.

(10) Patent No.: US 12,780,281 B2
(45) Date of Patent: Nov. 3, 2026

(54) TRAINING A MACHINE-LEARNING MODEL TO PREDICT LOCATION USING WHEEL MOTION DATA

(71) Applicant: Maplebear Inc., San Francisco, CA (US)

(72) Inventors: Lin Gao, Miami, FL (US); Yilin Huang, Shanghai (CN); Shiyuan Yang, Shanghai (CN); Xiaofei Zhou, Shanghai (CN); Kaiyang Chu, Shanghai (CN); Sikun Zhu, Shanghai (CN)

(73) Assignee: Maplebear Inc., San Francisco, CA (US)

( * ) Notice: Subject to any disclaimer, the term of this patent is extended or adjusted under 35 U.S.C. 154(b) by 656 days.

(21) Appl. No.: 17/873,528

(22) Filed: Jul. 26, 2022

(65) Prior Publication Data

US 2024/0003707 A1 Jan. 4, 2024

Related U.S. Application Data

(63) Continuation of application No. PCT/CN2022/102796, filed on Jun. 30, 2022.

(51) Int. Cl.

*B62B 5/00* (2006.01)
*B62B 3/14* (2006.01)
*G01C 21/00* (2006.01)
*G01C 21/16* (2006.01)
*G01S 5/00* (2006.01)

(Continued)

(52) U.S. Cl.

CPC .......... *B62B 5/0096* (2013.01); *B62B 3/1424* (2013.01); *G01C 21/16* (2013.01);

(Continued)

(58) Field of Classification Search

CPC ..... B62B 5/0096; B62B 3/1424; G01C 21/16; G01C 21/383; G01C 21/165;

(Continued)

(56) References Cited

U.S. PATENT DOCUMENTS 10,919,555 B1 2/2021 Spruill
11,254,002 B1 * 2/2022 Ebrahimi Afrouzi .. G06N 3/044

(Continued)

FOREIGN PATENT DOCUMENTS

DE 10039197 A1 3/2001
WO WO 2016/055815 A1 4/2016
WO WO 2020/242536 A1 12/2020

OTHER PUBLICATIONS

United States Office Action, U.S. Appl. No. 17/873,526, filed Jul. 19, 2024, 16 pages.

(Continued)

*Primary Examiner* — Donald J Wallace
*Assistant Examiner* — Paysun Wu
(74) *Attorney, Agent, or Firm* — Fenwick & West LLP

(57) ABSTRACT

A shopping cart's tracking system receives wheel motion data from a plurality of wheel sensors coupled to a plurality of wheels of the shopping cart, wherein the wheel motion data describes rotation of the plurality of wheels and orientation of the plurality of wheels. The tracking system predicts an estimated location of the shopping cart by applying a machine-learning location model to the wheel motion data. The machine-learning location model is trained with training examples that are generated by: receiving prior wheel motion data from the plurality of wheel sensors, partitioning the prior wheel motion data into a plurality of segments using a time window, receiving one or more baseline locations at one or more prior timestamps, and generating one or more training examples, each training example comprising a segment of prior wheel motion data and a baseline location with a timestamp overlapping the segment.

19 Claims, 9 Drawing Sheets

(51) Int. Cl.
*G07C 5/04* (2006.01)
*H04W 4/029* (2018.01)

(52) U.S. Cl.
CPC .......... *G01C 21/383* (2020.08); *G01S 5/0036* (2013.01); *G07C 5/04* (2013.01); *H04W 4/029* (2018.02)

(58) Field of Classification Search
CPC . G01C 21/206; G01S 5/0036; G01S 2205/01; G01S 5/0264; G07C 5/04; H04W 4/029
See application file for complete search history.

(56) References Cited

U.S. PATENT DOCUMENTS

| | | | |
|---|---|---|---|
| 12,227,219 | B2 | 2/2025 | Gao et al. |
| 2016/0023675 | A1 | 1/2016 | Hannah et al. |
| 2017/0066464 | A1 | 3/2017 | Carter et al. |
| 2018/0240554 | A1 | 8/2018 | Vasgaard et al. |
| 2020/0017135 | A1 | 1/2020 | Carter et al. |
| 2020/0079412 | A1 | 3/2020 | Ramanathan et al. |
| 2020/0219171 | A1 | 7/2020 | Zhuang et al. |
| 2022/0026920 | A1* | 1/2022 | Ebrahimi Afrouzi .... G06N 7/01 |

OTHER PUBLICATIONS

United States Office Action, U.S. Appl. No. 17/873,526, filed Mar. 14, 2024, 20 pages.
PCT International Search Report and Written Opinion, PCT Application No. PCT/CN2022/102796, Dec. 28, 2022, 10 pages.
Non-Final Rejection Mailed on Apr. 2, 2026 for U.S. Appl. No. 18/937,402, 18 page(s).

* cited by examiner

TRAINING A MACHINE-LEARNING MODEL TO PREDICT LOCATION USING WHEEL MOTION DATA

CROSS-REFERENCE TO RELATED APPLICATIONS

The present application is a continuation application of co-pending Paris Cooperation Treaty (PCT) international application no. PCT/CN2022/102796 filed on Jun. 30, 2022, with the China National Intellectual Property Office as the receiving office, which is herein incorporated by reference.

BACKGROUND

Traditional brick-and-mortar stores with human attendants and cashiers generally provide shopping carts and/or baskets to users for use in holding items to be purchased. When ready to checkout, the users present their items to a human cashier who manually scans each and every item.

Automated checkout systems allow a customer at a brick-and-mortar store to select and purchase items all without aid from a human attendant. Automated checkout systems aim to streamline such processes by equipping in-store devices with various sensors. Some automated checkout systems may track customer locations within the store to, for example, provide directions to a user on where an item is. However, these systems, e.g., GPS, are often inaccurate and require costly hardware that makes tracking a customer's location prohibitively expensive.

SUMMARY

In accordance with one or more aspects of the disclosure, a shopping cart utilizes a tracking system to self-track its location through an indoor environment. The tracking system on the shopping cart may include a computing device with a computer processor and memory. The tracking system may further include sensors or components that capture or receive data for tracking the shopping cart location. In some embodiments, the tracking system comprises a wireless device capable of communicating with external wireless device(s). The wireless device receives one or more signals from external wireless device(s) (e.g., RFID tags) located at known location(s) throughout the indoor environment. The shopping cart also comprises one or more wheel sensors coupled to one or more wheels of the shopping cart. The wheel sensor(s) are configured to measure wheel motion data describing the rotation of the wheels of the shopping cart to which the wheel sensors are coupled. Wheel motion data may include information identifying wheel rotation, wheel orientation, or some combination thereof. Other sensors may include an accelerometer, an inertial measurement unit, a magnetometer, one or more imaging devices, an inclinometer, etc. The tracking system of the shopping cart self-tracks using the wheel motion data, the signals received from the wireless device, other sensor data, or some combination thereof.

In one or more embodiments, the tracking system performs self-tracking using a combination of signals received from one or more external wireless devices and wheel motion data as measured by the wheel sensor(s). Self-tracking generally refers to a shopping cart continually determining its location in an environment through sensor data. The shopping cart's tracking system utilizes intermittent updates from external wireless device(s) to establish accurate estimates of the shopping cart's location, while utilizing the wheel motion data to measure translation between those updates from the external wireless device(s). For example, the shopping cart's tracking system determines a first baseline location of the shopping cart at a first timestamp based on proximity data. The proximity data may be received from a wireless device located on the shopping cart detecting one or more external wireless devices (e.g., RFID tags) in the indoor environment. The external wireless devices may be placed in known locations throughout the indoor environment. The shopping cart may further store a map of the indoor environment with the known locations of the external wireless devices. The shopping cart's tracking system may receive wheel motion data from one or more wheel sensors coupled to one or more wheels of the shopping cart, and the wheel motion data may describe rotation of the one or more wheels. The shopping cart's tracking system calculates a translation traveled by the shopping cart from the first baseline location based on the wheel motion data. The shopping cart's tracking system determines an estimated location of the shopping cart at a second timestamp based on the first baseline location and the translation.

In one or more embodiments, the tracking system performs self-tracking with a machine-learning location model. The shopping cart's tracking system receives wheel motion data from one or more wheel sensors coupled to one or more wheels of the shopping cart, where the wheel motion data describes rotation of the one or more wheels and orientation of the one or more wheels. The tracking system predicts a location of the shopping cart by applying a machine-learning location model to the wheel motion data. The machine-learning location model may be trained with training examples that are generated by: receiving prior wheel motion data from the one or more wheel sensors, partitioning the prior wheel motion data into a plurality of segments using a time window, receiving one or more baseline locations from external wireless devices at one or more prior timestamps, and generating a training example with a segment of prior wheel motion data and a baseline location with a timestamp overlapping the segment.

With the estimated location, the shopping cart can update a map with the estimated location of the shopping cart. The shopping cart may update a map locally stored on the shopping cart and/or an online map stored on an online system. The shopping cart can also provide location-based content to the user, e.g., via a display of the shopping cart. The location-based content can be selected by an online system based on the location of the shopping cart in the indoor environment.

DETAILED DESCRIPTION

Example System Environment for Automated Checkout System

Figure 1:
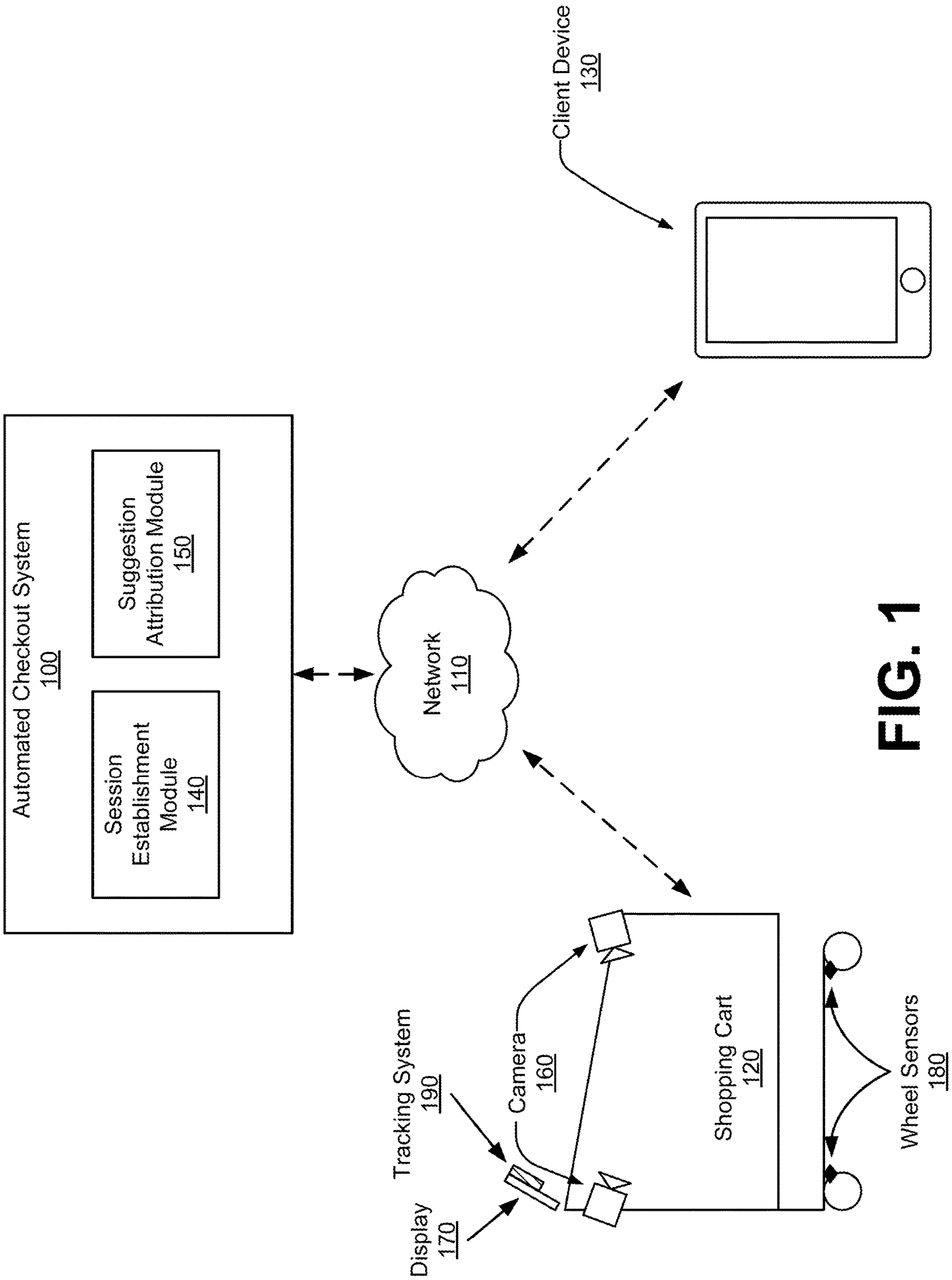
FIG. 1 illustrates an example system environment for an automated checkout system 100, in accordance with some embodiments.

FIG. 1 illustrates an example system environment for an automated checkout system 100, in accordance with some embodiments. The system environment illustrated in FIG. 1 includes an automated checkout system 100, a network 110, a shopping cart 120, and a client device 130. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The automated checkout system 100 allows a customer at a brick-and-mortar store to complete a checkout process in which items are scanned and paid for without having to go through a human cashier. The automated checkout system 100 receives data describing a user's shopping trip in a store and generates a shopping list based on items that the user has selected. For example, the automated checkout system 100 may receive image data from a shopping cart 120 and may determine, based on the image data, which items the user has added to their cart. When the user indicates that they are done shopping at the store, the automated checkout system 100 facilitates a transaction between the user and the store for the user to purchase the items that they have selected.

The automated checkout system 100 may include a session establishment module 140. The session establishment module 140 establishes a session between a client device 130 and a shopping cart 120. A session is an association of the shopping cart 120 with the client device 130 such that actions taken with respect to the shopping cart 120 are associated with a user corresponding to the client device 130. For example, if a session is established between a shopping cart 120 and a client device 130, the automated checkout system 100 may associate items added to a storage area of the shopping cart 120 with the user corresponding to the client device 130 so that the user is charged for the items. The session establishment module 140, in accordance with some embodiments, is described in further detail below with regards to FIG. 2.

The automated checkout system may include a suggestion attribution module 150. The suggestion attribution module 150 uses an attribution model to determine whether to attribute a target action to a recipe suggestion. Specifically, the suggestion attribution module 150 identify an item that has been added to the shopping cart, determine whether it matches with an item in a set of items for a recipe suggestion, and then determine whether to attribute the recipe suggestion with the user adding the item to the storage area of the shopping cart. The suggestion attribution module 150, in accordance with some embodiments, is described in further detail below with regards to FIG. 3.

As noted above, while the automated checkout system 100 is depicted in FIG. 1 as separate from the shopping cart 120 and the client device 130, some or all of the functionality of the automated checkout system 100 may be performed by the shopping cart 120 or the client device 130. For example, the shopping cart 120 or the client device 130 may store a user's shopping list and update the shopping list based on data gathered by the shopping cart 120 or the client device 130.

A shopping cart 120 is a vessel that a user can use to hold items as the user travels through a store. The shopping cart 120 may include one or more cameras 160 that capture image data of the shopping cart's basket. The image data captured by the cameras 160 may be used by the automated checkout system 100 to identify items that the user adds to the shopping cart 120 and to update the user's shopping list as the user shops at the store. One or more of the cameras 160 may be outward facing as well, configured to capture image data of an environment that the shopping cart 120 is in.

The shopping cart 120 includes a display 170 through which the user can interact with the automated checkout system 100. For example, the user can use a user interface presented on the display 170 to adjust the items in their shopping list or to provide payment information for a checkout process. Additionally, the automated checkout system 100 may instruct the display 170 to present a recipe suggestion to a user.

The shopping cart 120 includes one or more wheel sensors 180 configured to measure wheel motion data of the one or more wheels. The wheel sensors 180 may be coupled to one or more of the wheels on the shopping cart. In one or more embodiments, a shopping cart 120 includes at least two wheels (e.g., four wheels in the majority of shopping carts) with two wheel sensors coupled to two wheels. In further embodiments, the two wheels coupled to the wheel sensors can rotate about an axis parallel to the ground and can orient about an axis orthogonal or perpendicular to the ground. In other embodiments, each of the wheels on the shopping cart has a wheel sensor (e.g., four wheel sensors coupled to four wheels). The wheel motion data includes at least rotation of the one or more wheels. Rotation may be measured as a rotational position, rotational velocity, rotational acceleration, some other measure of rotation, or some combination thereof. Rotation for a wheel is generally measured along an axis parallel to the ground. The wheel rotation may further include orientation of the one or more wheels. Orientation may be measured as an angle along an axis orthogonal or perpendicular to the ground. For example, the wheels are at 0° when the shopping cart is moving straight and forward along an axis running through the front and the back of the shopping cart. Each wheel sensor 180 may be a rotary encoder, a magnetometer with a magnet coupled to the wheel, an imaging device for capturing one or more features on the wheel, some other type of sensor capable of measuring wheel motion data, or some combination thereof.

Figure 5:
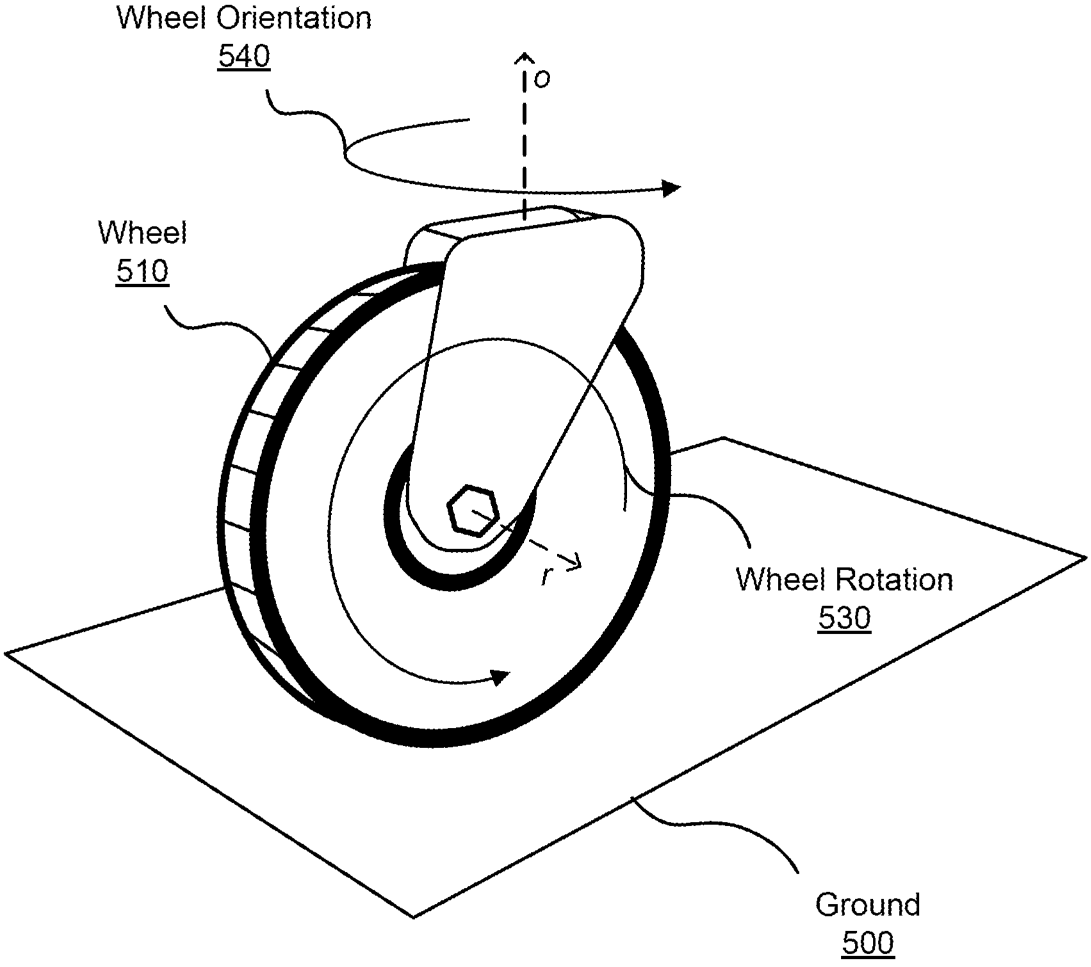
FIG. 5 illustrates an example shopping cart wheel and wheel motion data measured by a wheel sensor, in accordance with some embodiments.

Referring to FIG. 5, FIG. 5 illustrates an example shopping cart wheel 510 and wheel motion data measured by a wheel sensor, in accordance with some embodiments. The wheel 510 is an embodiment of the wheels on the shopping cart 120. In one or more embodiments, the shopping cart 120 comprises a plurality of wheels, e.g., four wheels. Each wheel is configured to rotate about an axis r that is parallel to the ground 500. The wheel sensor 180 measures wheel rotation 530 about the axis r. One or more of the wheels are configured to rotate about an axis o that is perpendicular or orthogonal to the ground 500. The wheel sensors 180 (not illustrated in FIG. 5) measures wheel orientation 540 about the axis o. The wheel rotation 530 can inform distance traveled by the shopping cart 120. The wheel orientation 540 can inform direction of travel by the shopping cart 120.

The shopping cart 120 includes a tracking system 190 configured to track a position, an orientation, movement, or some combination thereof of the shopping cart 120 in an indoor environment. The tracking system 190 may be a computing system comprising at least one processor and computer memory. The tracking system 190 may further include other sensors capable of capturing data useful for determining position, orientation, movement, or some combination thereof of the shopping cart 120. Other example sensors include, but are not limited to, an accelerometer, a gyroscope, etc.

The tracking system 190 may provide real-time location of the shopping cart 120 to an online system and/or database. The location of the shopping cart 120 may inform content to be displayed by the display 170. For example, if the shopping cart 120 is located in one aisle, the display can provide navigational instructions to a user to navigate them to a product in the aisle. In other example use cases, the display can provide suggested products or items located in the aisle based on the user's location.

In one or more embodiments, the tracking system 190 includes a wireless device configured to wirelessly communicate with other wireless devices. The tracking system 190 may determine location of the shopping cart 120 based on the communications. For example, the wireless receiving device may be configured for radio-frequency identification (RFID) communication. The wireless device can transmit an interrogation pulse. The other devices, e.g., located around the indoor environment, can provide response signals to the wireless device of the tracking system 190. The tracking system 190 may localize the shopping cart 120 based on any response signal received. As one example, the tracking system 190 may triangulate the location of the shopping cart 120 utilizing at least three response signals from other wireless devices.

The tracking system 190 performs a self-tracking algorithm to continue tracking the location of the shopping cart 120 based on the data captured (e.g., the response signals from the wireless devices, wheel motion data, acceleration data, etc.). In one or more embodiments, the tracking system 190 utilizes response signals received from one or more wireless devices positioned around the indoor environment to locate the shopping cart 120 in relation to the wireless devices. The tracking system 190 may then utilize wheel motion data to update the shopping cart's 120 location as the shopping cart moves around the indoor environment. In other embodiments, the tracking system 190 may train one or more machine-learning models to aid in self-tracking. For example, one machine-learning model may be a location model trained to predict the location based on sensor inputs, e.g., wheel motion data, acceleration data, etc. The self-tracking algorithm is further described in at least FIGS. 4 & 7-9.

The tracking system 190 may further maintain a locally-stored map of the indoor environment. The tracking system 190 may receive information on the layout of the indoor environment, e.g., placement of shelves, tables, automated checkout systems, external wireless devices, etc. Upon self-tracking, the tracking system 190 may update its real-time location on the locally-stored map. At some frequency, the tracking system 190 may synchronize with an online system storing a global map to provide updates on the shopping cart's location. The online system may further communicate updated information on the layout of the indoor environment, e.g., if fixtures move, or if some checkout lanes close, etc.

A user can also interact with the automated checkout system 100 through a client device 130. The client device 130 can be a personal or mobile computing device, such as a smartphone, a tablet, a laptop computer, or desktop computer. In some embodiments, the client device 130 executes a client application that uses an application programming interface (API) to communicate with the automated checkout system 100 through the network 110.

The user may interact with the shopping cart 120 or the automated checkout system 100 through the client device 130. For example, the user may use the client device 130 to capture image data of items that the user is selecting for purchase, and the client device 130 may provide the image data to the automated checkout system 100 to identify the items that the user is selecting. Additionally, the user may use the client device 130 to adjust their shopping list and the client device 130 may instruct the automated checkout system 100 to make the adjustments to the shopping list indicated by the user.

In some embodiments, a user who interacts with the shopping cart 120 or the client device 130 may be a shopper for an online concierge system. The shopper is a user who collects items from a store on behalf of a user of the online concierge system. For example, a user may submit a list of items that they would like to purchase. The online concierge system may transmit that list to a shopping cart 120 or a client device 130 used by a shopper. The shopper may use the shopping cart 120 or the client device 130 to add items to the user's shopping list. When the shopper has gathered the items that the user has requested, the shopper may perform a checkout process through the shopping cart 120 or client device 130 to charge the user for the items. U.S. Pat. No. 11,195,222, entitled "Determining Recommended Items for a Shopping List" and issued Dec. 7, 2021, describes online concierge systems in more detail, and the contents of this patent are incorporated by reference herein in their entirety.

The shopping cart 120 and client device 130 can communicate with the automated checkout system 100 via the network 110, which may comprise any combination of local area and wide area networks employing wired or wireless communication links. In some embodiments, the network 110 uses standard communications technologies and protocols. For example, the network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any format, such as hypertext markup language (HTML) or extensible markup language (XML). In some embodiments, all or some of the communication links of the network 110 may be encrypted. In some embodiments, the network 110 may include Bluetooth or near-field communication (NFC) technologies or protocols.

Example Session Establishment Module

Figure 2:
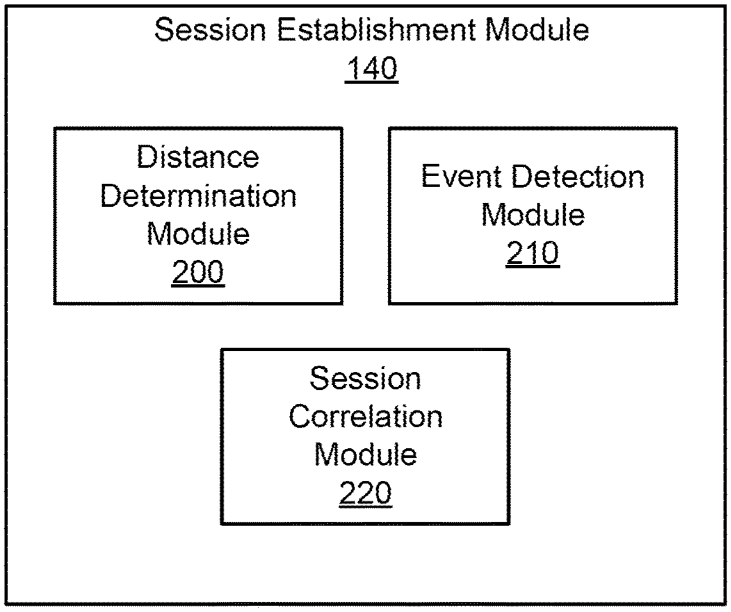
FIG. 2 illustrates an example system architecture for a session establishment module 140, in accordance with some embodiments.

FIG. 2 illustrates an example system architecture for a session establishment module 140, in accordance with some embodiments. Alternative embodiments may include more, fewer, or different components from those illustrated in FIG. 2, and the functionality of each component may be divided between the components differently from the description below. Additionally, the session establishment module 140 illustrated in FIG. 2 may be the same session establishment module 140 illustrated in FIG. 1.

The distance determination module 200 determines a distance between a client device and a shopping cart. To determine the distance between the client device and the shopping cart, the distance determination module receives device sensor data from one or more sensors. The device sensor data is sensor data that describes one or more measurements of the client device. For example, the device sensor data may include GPS data, Bluetooth data, accelerometer data, WiFi data, image data, sound data, or NFC data. The one or more sensors may be coupled to the client device, the shopping cart, or to portions of a brick-and-mortar store in which the client device is located.

The distance determination module 200 additionally receives cart sensor data from one or more sensors. The cart sensor data is sensor data that describes one or more measurements of the shopping cart. For example, the cart sensor data may include GPS data, Bluetooth data, accelerometer data, WiFi data, image data, sound data, or NFC data. The distance determination module 200 may receive cart sensor data from any of the one or more sensors that generated the device sensor data. The distance determination module 200 additionally may receive cart sensor data from one or more other sensors that may be coupled to the client device, the shopping cart, or to portions of a brick-and-mortar store in which the shopping cart is located. The cart sensor data may overlap with the device sensor data, in that sensor data received from a sensor may be used as both cart sensor data and device sensor data. For example, Bluetooth data describing a strength of a Bluetooth signal between the shopping cart and the client device may be used as both cart sensor data and device sensor data.

The cart sensor data may include sensor data describing measurements of a storage area of the shopping cart. For example, the cart sensor data may include image data, depth data, weight data, or temperature data for the storage area of the shopping cart. The cart sensor data of the storage area of the shopping cart may be captured by sensors coupled to the shopping cart, sensors coupled to the client device, or sensors coupled to portions of the brick-and-mortar store.

The distance determination module 200 determines a distance between the client device and the shopping cart based on the device sensor data and the cart sensor data. The distance determination module 200 may determine the distance between the client device and the shopping cart based on absolute locations of the client device and the shopping cart. For example, the distance determination module 200 may determine an absolute location of the device and an absolute location of the cart based on GPS data describing the location of the client device and the shopping cart. The distance determination module 200 may determine the distance between these locations based on the GPS data. The distance determination module 200 also may determine the distance between the client device and the shopping cart based wireless signals between the client device and the shopping cart. For example, the distance determination module 200 may receive cart sensor data or device sensor data that includes measurements of a WiFi, Bluetooth, or NFC signal strength between the client device and the shopping cart, and may estimate the distance between the client device and shopping cart based on the signal strength.

In some embodiments, the distance determination module 200 determines a distance between a shopping cart and multiple client devices. The distance determination module 200 may receive device sensor data describing multiple client devices. The distance determination module 200 may determine the distance between each client device and the shopping cart.

The distance determination module 200 may continually determine a distance between the shopping cart and a client device. For example, the distance determination module 200 may continually update the distance between the shopping cart and the client device when the distance determination module 200 receives cart sensor data or device sensor data. The distance determination module 200 may store the distance with a timestamp of when the distance was calculated. The timestamps may correspond with when the distance determination module receives cart sensor data or device sensor data. The timestamps also may correspond to timestamps when the event detection module 210 detects an action event, as described below.

The event detection module 210 detects an action event based on cart sensor data. An action event is an event that indicates that a user has interacted with the shopping cart. For example, an action event may include an item added to the shopping cart's storage area, the shopping cart being moved, or a user interacting with a display of the shopping cart. In some embodiments, the event detection module detects an action event when weight data describing a total weight of items in the shopping cart's storage area indicates that a new item has been added to the storage area. For example, if the user adds a new item to the shopping cart, the total weight of the items in the storage area changes. If the event detection module 210 detects the change in the total weight based on cart sensor data, the event detection module 210 detects that an action event has occurred. Additionally, the event detection module 210 may receive accelerometer data describing an acceleration of the shopping cart, and may detect an action event when the accelerometer data indicates that the user is moving the shopping cart.

The event detection module 210 may store detected action events associated with a shopping cart. The event detection module 210 may store each action event with event metadata. For example, each action event may be stored with an identifier of what kind of action event the event detection module 210 detected (e.g., an item-added action event or cart-moved action event). Similarly, the event detection module 210 also may store a timestamp of when the action event was detected.

The session correlation module 220 infers whether to establish a session between a user corresponding to a client device and a shopping cart. A session is an association of the shopping cart with the user corresponding to a client device such that actions taken with respect to the shopping cart are associated with the user. For example, a user in a session with a shopping cart may be associated with any further action events that occur with regards to the shopping cart, such as the addition of an item to the shopping cart or an interaction with the display of the shopping cart. In some embodiments, the session correlation module 220 associates the user and the shopping cart with a session identifier in a session database. The session identifier may be a unique identifier of the session between the shopping cart and the user.

The session correlation module 220 establishes a session between a user and a shopping cart by correlating action events with distances between client devices and the shopping cart. For example, the session correlation module 220 may determine whether action events occur more commonly when the distance between a client device and a shopping cart is low than when the distance is high. If so, the session correlation module 220 may establish a session between the shopping cart and the user corresponding to the client device. The session correlation module 220 also may compare distances of multiple client devices to the shopping cart and determine which client device is most correlated to the action events. For example, the session correlation module 220 may determine which of a set of client devices is closest to the shopping cart when action events occur, and may establish a session between the shopping cart and the user corresponding to that client device.

The session correlation module 220 may establish a session between a user and a shopping cart based on a set of action event rules. An action event rule is a rule that specifies circumstances that indicate whether the user is using the shopping cart. For example, an action event rule may specify that a session should be established if an action event occurs while the client device is within a threshold distance of the shopping cart. In some embodiments, an action event rule may further require that a threshold number of action events occur while the client device is within the threshold distance of the shopping cart.

In some embodiments, the session correlation module 220 applies a machine-learning model (e.g., a neural network) to the action events and the distances to determine whether to establish a session between a user and a shopping cart. The machine-learning model may be trained to generate correlation scores based on action events and distances between the client device and the shopping cart. The correlation scores indicate how correlated the action events are with the distances. The machine-learning model may be trained based on a set of training examples that include distances between a shopping cart and a client device, action events, and labels indicating whether the client device is in a session with the shopping cart. In some embodiments, the machine-learning model is trained as a classifier.

The session correlation module 220 may associate actions taken with respect to the shopping cart with a user who is in a session with the shopping cart. For example, items added to a storage area of the shopping cart may be associated with the user so that the user is charged for the items. Similarly, the session correlation module 220 may use session to identify user data to use for suggesting a recipe to the user, if the user has opted into such a service.

Example Suggestion Attribution Module

Figure 3:
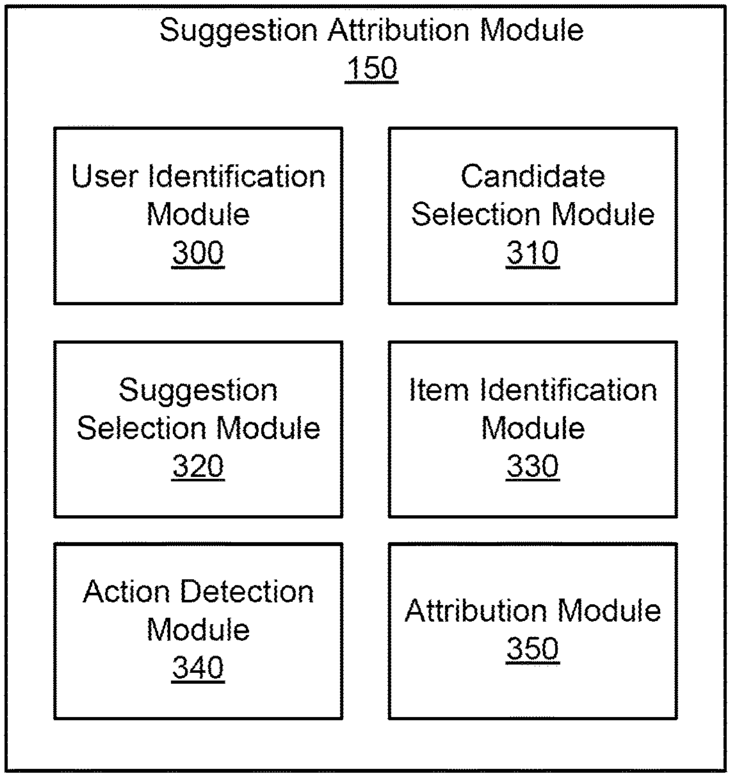
FIG. 3 illustrates an example system architecture for a suggestion attribution module 150, in accordance with some embodiments.

FIG. 3 illustrates an example system architecture for a suggestion attribution module 150, in accordance with some embodiments. Alternative embodiments may include more, fewer, or different components from those illustrated in FIG. 3, and the functionality of each component may be divided between the components differently from the description below. Additionally, the suggestion attribution module 150 illustrated in FIG. 3 may be the same suggestion attribution module 150 illustrated in FIG. 1.

The user identification module 300 identifies a user that is associated with a shopping cart. The user identification module 300 may identify a user by identifying a client device corresponding to the user. For example, the user identification module 300 may receive, from the session establishment module 140, an identifier for a client device that is in a session with a shopping cart, and may identify the user that is associated with the client device.

The candidate selection module 310 selects a set of candidate recipe suggestions for possible application to the user. A recipe is a set of instructions and products that allow a user to produce an end product. For example, a recipe for tomato sauce may include canned tomatoes, basil, garlic, parsley, and olive oil as ingredients and may include instructions for how to turn those ingredients into tomato sauce. Each recipe may be associated with a set of recipe items, which are items that the user can purchase to complete the recipe. A recipe's set of items may include specific items (e.g., an item from a particular brand or retailer) or generic items.

A recipe suggestion is a suggestion to a user of a recipe for which the user may want to purchase items. For example, for a chicken soup recipe, a recipe suggestion may suggest that the user purchase soup stock, chicken, onions, carrots, and celery. A recipe suggestion may include instructions to be transmitted to a display of a shopping cart to present the recipe to the user. For example, a recipe suggestion may include instructions to cause the display to present an image of the recipe, a title of the recipe, a description of the recipe, or the set of items that is associated with the recipe. Additionally, a recipe suggestion may include instructions to the shopping cart to display user elements that allow the user to interact with the recipe. For example, the recipe suggestion may instruct the shopping cart to display user elements that allow the user to select the recipe to be shown the set of items for the recipes, or to request an indication of where items are in the store for the user to procure.

The candidate selection module 310 selects a set of candidate recipe suggestions. The candidate selection module 310 may randomly select the set of candidate recipe suggestions or may select the candidate recipe suggestions based on some selection criteria. For example, each recipe suggestion may be associated with a popularity score indicating how popular the recipe is with users generally, and the candidate selection module 310 may only select candidate recipe suggestions with popularity scores that exceed a threshold.

The suggestion selection module 320 selects a recipe suggestion of the set of candidate recipe suggestions to apply to the user. The suggestion selection module 320 selects a recipe suggestion by generating suggestion scores for each of the candidate recipe suggestions. A suggestion score is a score that represents a measure of affinity of the user for the recipe suggestion. For example, a suggestion score may represent a likelihood that the user will follow the recipe of a recipe suggestion and will purchase items in the set of items for the recipe. The suggestion selection module 320 may generate a suggestion score for a candidate recipe suggestion by applying a suggestion scoring model to the candidate recipe suggestion. A suggestion scoring model is a machine-learning model (e.g., neural network) that is trained to generate suggestion scores for recipe suggestions. The suggestion scoring model may be applied to suggestion data describing each recipe suggestion. For example, the suggestion scoring model may be applied to the list of items associated with the recipe or certain keywords or identifiers that describe characteristics of the recipe.

The suggestion scoring model may also be trained to generate suggestion scores for recipe suggestions based on user data describing characteristics of a user. The user data may describe a user's interactions with the online concierge system, such as when the user has interacted with the automated checkout system, what kinds of interactions the user has had with the automated checkout system, how often the user interacts with the automated checkout system, or characteristics of the user's interactions with the automated checkout system. Additionally, the user data may describe demographic or personal information about the user, such as the user's name, age, gender, sex, income, contact information, location, or residence, if the user has opted to share such information under one or more applicable privacy policies.

The suggestion selection module 320 selects a recipe suggestion to apply to the user based on the suggestion scores for the candidate recipe suggestions. For example, the suggestion selection module 320 may rank the candidate recipe suggestions based on their suggestion scores and may select the recipe suggestion with the highest suggestion score. Similarly, the suggestion selection module 320 may identify which candidate recipe suggestions have suggestion scores that exceed a threshold, and randomly selects a recipe suggestion from among those candidate recipe suggestions. In some embodiments, the suggestion selection module 320 selects more than one recipe suggestion that exceeds the threshold, or selects a certain number of best candidate recipe suggestions based on a ranking of the suggestion scores of the candidate recipe suggestions.

The suggestion selection module 320 applies the selected recipe suggestion to the user. The suggestion selection module 320 may apply the selected recipe suggestion by transmitting instructions to the user's shopping cart to present the recipe on a display of the shopping cart, along with information describing the recipe. Similarly, the suggestion selection module 320 may transmit instructions to the shopping cart to present a user interface to the user that allows the user to interact with the recipe from the selected recipe suggestion. The suggestion selection module 320 may store a timestamp of when the suggestion selection module 320 applies the selected recipe suggestion to the user. For example, the suggestion selection module 320 may store a timestamp of when the suggestion selection module 320 transmits instructions to the shopping cart to apply the selected recipe suggestion or may store a timestamp of when the shopping cart displays the recipe suggestion to the user.

The item identification module 330 detects whether an item has been added to a storage area of the shopping cart and identifies the item. The item identification module 330 may detect that an item has been added to the storage area based on cart sensor data. For example, the item identification module 330 may detect a change in the total weight of the items in the cart based on weight sensor data, and determine that an item has been added. Similarly, the item identification module 330 may detect an item being added to the shopping cart based on proximity sensor data.

The item identification module 330 identifies the detected item based on cart sensor data describing the storage area of the shopping cart. The item identification module 330 may identify the item based on image data, depth data, weight data, or temperature data. In some embodiments, the item identification module 330 identifies the item in image data by applying an item recognition model to one or more images captured of the storage area of the shopping cart. For example, the detected item may be depicted in an image captured of the storage area of the shopping cart, and the item identification module 330 may apply an item recognition model to the image to identify the item. The item recognition model is a machine-learning model (e.g., a neural network) that is trained to predict an identifier for an item depicted in an image. In some embodiments, the item recognition model is trained as a classifier.

The action detection module 340 detects whether a target action occurs with regards to the item added to the storage area of the shopping cart. A target action is an action that the automated checkout system encourages the user to perform with regards to an item. For example, the target action may include the purchase of the item, requesting more details about the item from the automated checkout system, or the procurement of a related item. The action detection module 340 may detect whether a target action occurs by receiving information describing the target action. The action detection module 340 may receive the information from the client device, the shopping cart, other components of the automated checkout system, other components of the suggestion attribution module 150, or from sensors coupled to the shopping cart, the client device, or portions of the brick-and-mortar store.

The attribution module 350 determines whether to attribute the recipe suggestion with the target action. By attributing the target action to the recipe suggestion, the attribution module 350 assigns the recipe suggestion as the cause of the user performing the target action. For example, where the target action is a purchase of an item, the attribution module 350 may attribute the purchase of the item to the recipe suggestion.

The attribution module 350 applies an attribution model to the target action and the recipe suggestion to attribute the target action to the recipe suggestion. The attribution model comprises a set of attribution rules for determining whether to attribute a target action to a recipe suggestion. For example, an example attribution rule may require that the recipe suggestion be provided before the item is added to the storage area of the shopping cart for the recipe suggestion to get attribution for the target action.

In some embodiments, the attribution model comprises an attribution rule that requires that the item added to the shopping cart match with a recipe item from the set of recipe items for the recipe of the recipe suggestion. The attribution module 350 may compare the item with the set of items associated with the recipe, and may match the item with one of the items in the set. If the item matches with one of the items from the set of items, the attribution module 350 may attribute the target action to the recipe suggestion. Similarly, the attribution rule may require that more than one item from the set of items for the recipe be included in the storage area. For example, the attribution rule may set a threshold number of items from the recipe to be included in the storage area of the shopping cart for the recipe suggestion to be attributed with the target action.

In some embodiments, the attribution model includes an attribution rule that requires that the item not be a staple item for the recipe suggestion to be attributed with the target action. A staple item is an item that a user commonly procures for reasons that are unrelated to a recipe. If the item added to the shopping cart after the recipe suggestion is presented was a staple item, the attribution rule may preclude the recipe suggestion from being attributed with the target action, even if the item in the set of items for the recipe. U.S. Pat. No. 11,282,126, entitled "Learning Staple Goods for a User" and issued on Mar. 22, 2022, describes staple items in more detail and is incorporated by reference.

In some embodiments, the attribution model includes a machine-learning model (e.g., a neural network) that is trained to predict whether a recipe suggestion caused the user to perform the target action. The efficacy prediction model may be applied to information describing the target action and the recipe suggestion to generate a prediction score for the applied recipe suggestion that represents the likelihood that the recipe suggestion caused the user to perform the target action.

If the attribution module 350 attributes the target action to a recipe suggestion, the attribution module 350 may store an indication of the attribution in a database. The attribution module 350 also may provide consideration to third parties who provide recipes to the automated checkout system. If the attribution module 350 attributes a target action to recipe suggestion, the attribution module 350 may provide consideration to a third party who provided the recipe suggestion to the automated checkout system. For example, the attribution module 350 may provide a portion of the purchase revenue from an item being purchased to the third party.

Example Sensor Capture and Distance Determination

Figure 4:
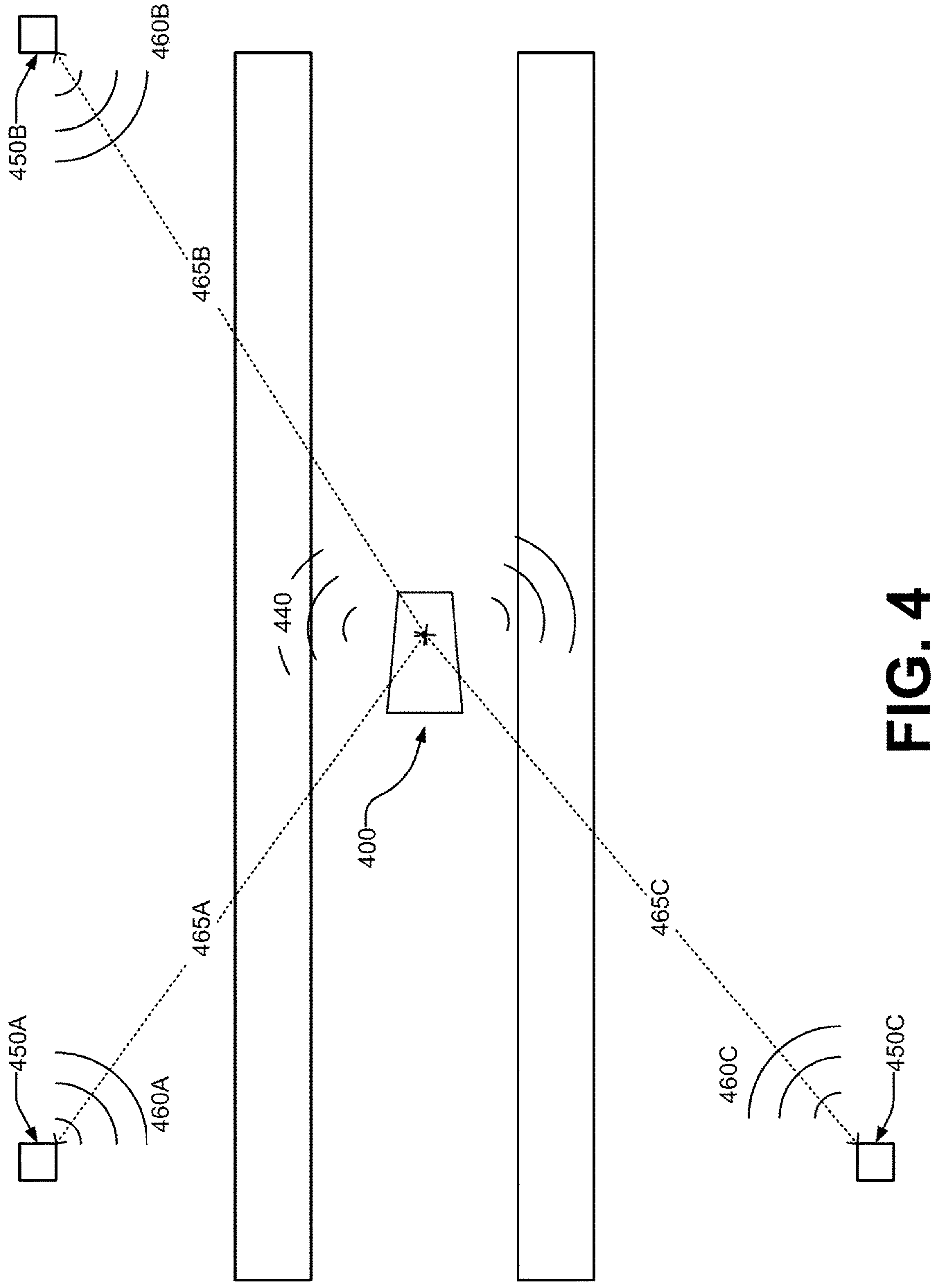
FIG. 4 illustrates an example process of self-tracking of a shopping cart, in accordance with some embodiments.

FIG. 4 illustrates an example layout of an indoor environment for self-tracking of a shopping cart, in accordance with some embodiments. The shopping cart 400 is located in an indoor environment of a store. The shopping cart 400 is an embodiment of shopping cart 120 in FIG. 1. The shopping cart 400 comprises a tracking system (e.g., the tracking system 190) capable of self-tracking the shopping cart 400 within the indoor environment. The indoor environment comprises one or more wireless devices 450 positioned around the indoor environment. In one or more examples, the wireless devices 450 can be configured for RFID communication. The tracking system may broadcast an interrogation pulse 440 into the indoor environment. The interrogation pulse 440 triggers the wireless devices 450 to provide response signals 460. The tracking system may determine a location of the shopping cart 400 based on the response signals 460. In one or more embodiments, the tracking system may calculate distances 465 between the shopping cart 400 and the various wireless devices 450 to triangulate the location of the shopping cart 400. In the example shown, wireless device 450A provides response signal 460A to the tracking system which calculates distance 465A between the shopping cart 400 and the wireless device 450A. Likewise, the tracking system can calculate distance 465B based on response signal 460B from wireless device 450B, and distance 465C based on response signal 460C from wireless device 450C. In some embodiments, the tracking system may be a passive receiving device that listens for the response signals 460 which are generated by the wireless devices 450 without trigger from the interrogation pulse 440. The tracking system may then utilize wheel motion data to update location of the shopping cart 400.

Example User Interface for Recipe Display

Figure 6:
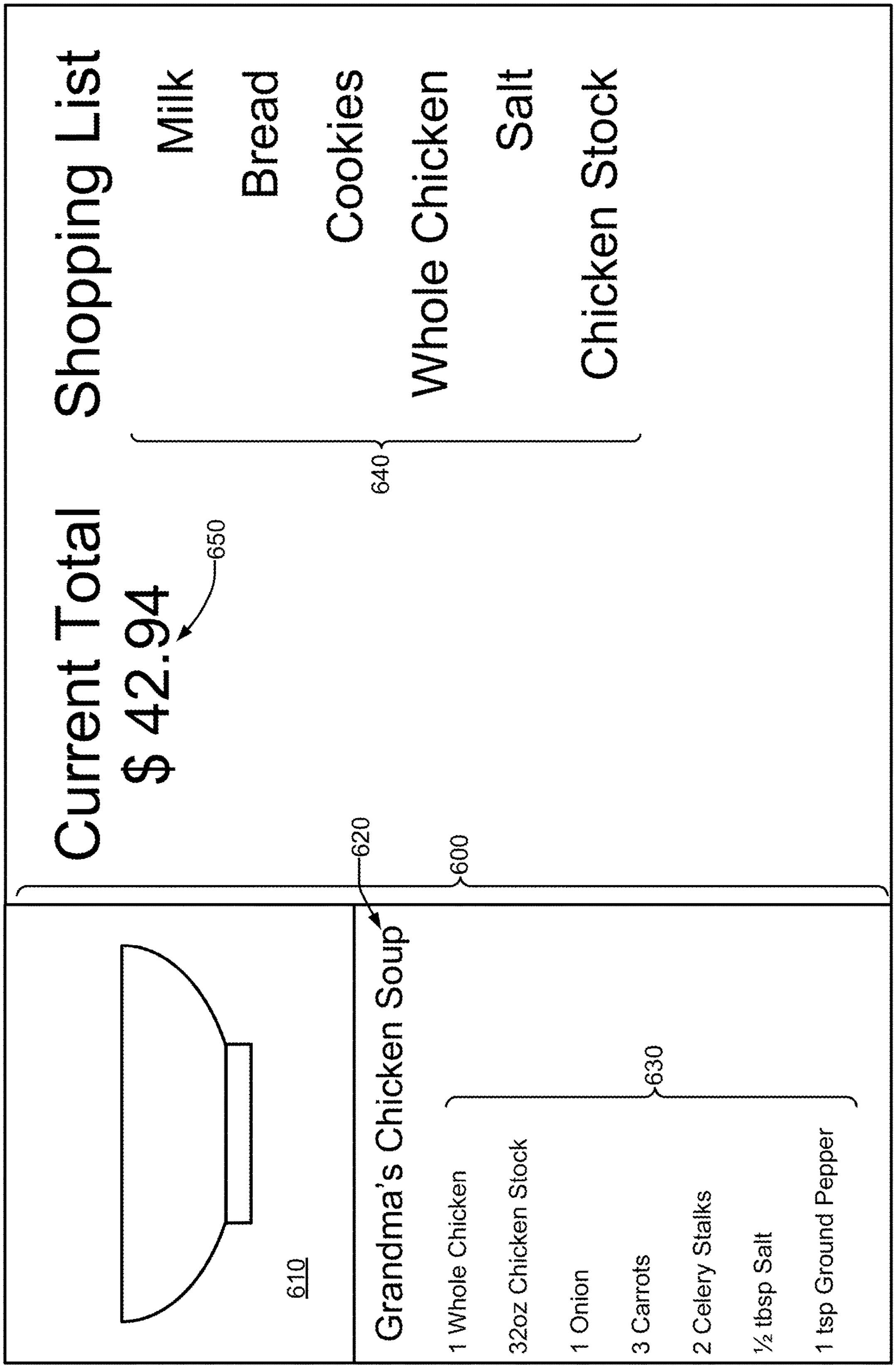
FIG. 6 illustrates an example user interface displaying a recipe when a recipe suggestion is applied to a user, in accordance with some embodiments.

FIG. 6 illustrates an example user interface displaying a recipe when a recipe suggestion is applied to a user, in accordance with some embodiments. Alternative user interfaces may include more, fewer, or different elements from those illustrated in FIG. 6, and the elements may be arranged or displayed differently from FIG. 6. The example user interface of FIG. 6 may be presented on a display of a shopping cart, or may be presented to the user on a client device corresponding to the user applied with a recipe suggestion.

The user interface presents the recipe 600 to the user with an image 610 of the recipe, the title 620 of the recipe, and a set 630 of items used to prepare the recipe. The user interface may also display a list 640 of items that the user has added to a storage area of their shopping cart and the total cost 650 of items that have been added so far. As described above, the automated checkout system may determine which items in the list 640 the user has added to the storage area of the shopping cart due to the presentation of the recipe 600 to the user. For example, the automated checkout system may compute an efficacy score for the recipe suggestion that indicates a likelihood that the recipe suggestion caused the user to add the "whole chicken" item and the "chicken stock" item to the storage area of the shopping cart.

Example Method for Self-Tracking by a Shopping Cart

Figure 7:
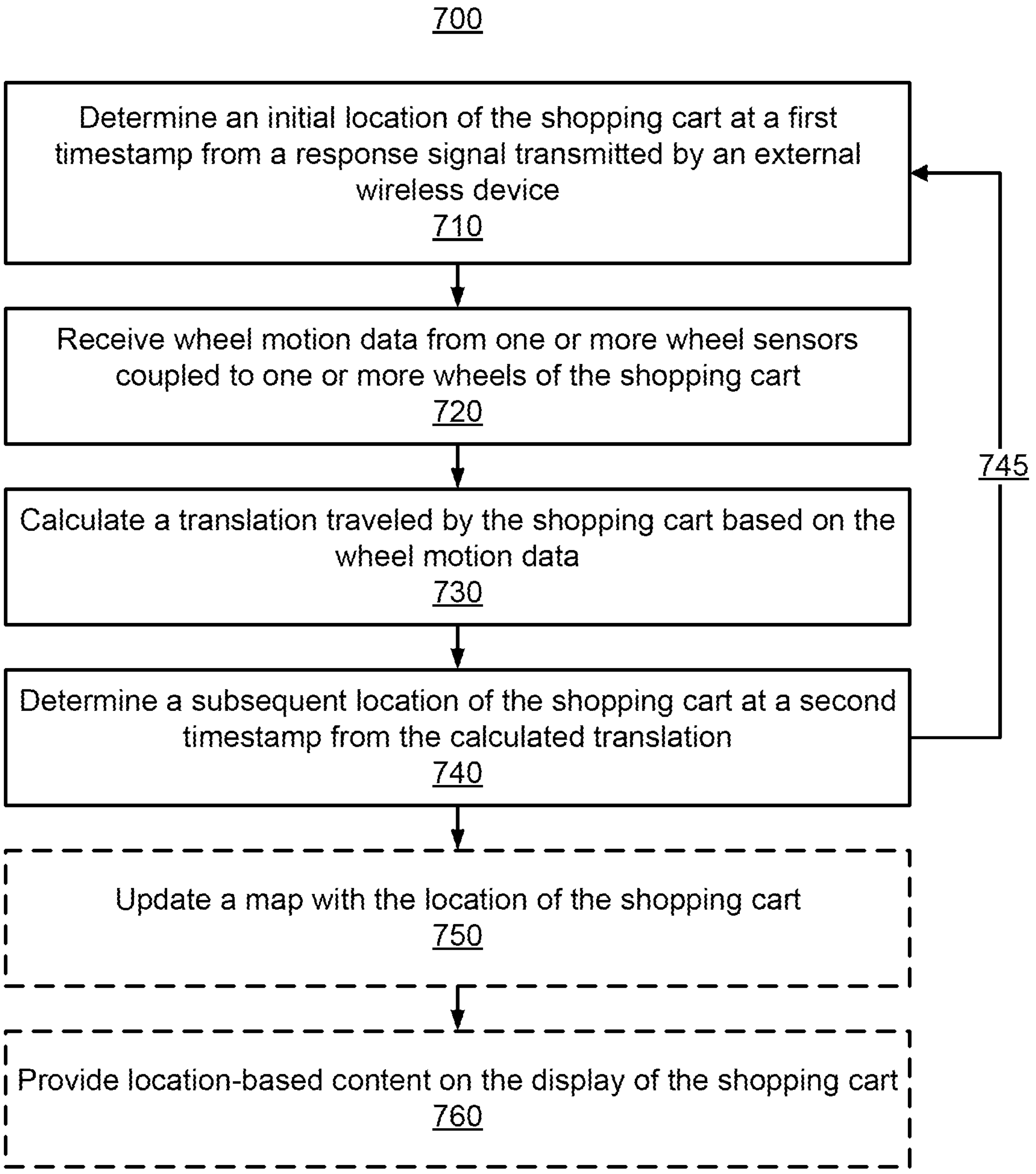
FIG. 7 is a flowchart illustrating an example method of self-tracking by a shopping cart, in accordance with some embodiments.

FIG. 7 is a flowchart illustrating an example method 700 of self-tracking by a shopping cart, in accordance with some embodiments. The shopping cart may be an embodiment of the shopping cart 120 in FIG. 1. Although the following description is in the perspective of the shopping cart performing the method 700, other components such as the automated checkout system 100, the client device 130, or any other system in communication with the shopping cart via the network 110 may perform some or all of the steps in the method 700. Moreover, the tracking system 190 of the shopping cart may perform the method 700.

The shopping cart determines 710 a first baseline location of the shopping cart at a first timestamp from a response signal transmitted by an external wireless device. The shopping cart may comprise a wireless device that can communicate with one or more external wireless devices positioned around the indoor environment. In one or more embodiments, the shopping cart's wireless device can broadcast an interrogation pulse. In response, the external wireless devices provide response signals to the shopping cart's wireless device. In other embodiments, the shopping cart's wireless device passively receives response signals from the external wireless devices. The shopping cart (e.g., via the tracking system) may calculate a distance from each wireless device providing a response signal using time-of-flight measurements. For example, a response signal provided in 0.25 milliseconds can be converted into a distance knowing the speed of the signal (e.g., speed of light for RFID communications).

The shopping cart receives 720 wheel motion data from one or more wheel sensors coupled to the one or more wheels of the shopping cart. In some embodiments, each wheel of the shopping cart has a wheel sensor. In other embodiments, a subset of the wheels have a wheel sensor coupled to them. The wheel motion data describes rotation of the one or more wheels, and may also describe orientation of the one or more wheels.

The shopping cart may also receive other sensor data from sensors on the shopping cart. Other sensor data may include, but is not limited to, acceleration data measured from an accelerometer, data from a magnetometer, and data from an inclinometer. The acceleration data may aid in determining direction of movement. Magnetometer data may also aid in orienting the shopping cart. Inclinometer data may provide information on incline of the shopping cart, e.g., if traveling up and/or down sloped ramps.

The shopping cart calculates 730 a translation traveled by the shopping cart based on the wheel motion data. Translation may include both direction and distance traveled. The shopping cart may calculate the direction of travel based on the orientation coming from the wheel motion data. In some embodiments, the direction of travel is further calculated based on accelerometer data, magnetometer data, etc. The shopping cart may calculate the distance traveled based on the rotation coming from the wheel motion data. As dimensions of the wheels are generally known by the shopping cart, the shopping cart can convert the number of rotations to distance traveled. In some embodiments, the distance traveled is further calculated based on accelerometer data. The accelerometer data provides movement, e.g., measured in acceleration of the shopping cart. The shopping cart can integrate distance from acceleration.

The shopping cart determines 740 a subsequent location of the shopping cart at a second timestamp from the calculated translation. The shopping cart starts tracking from its location from the first baseline location as determined in step 710. As the shopping cart calculates translation (e.g., may be in real-time), the shopping cart translates from the first baseline location to determine the subsequent location at the second timestamp. The shopping cart can iteratively determine its real-time location by continually calculating translations between locations after the first baseline location.

In some embodiments, the shopping cart can iterate 745 one or more steps. For example, the shopping cart, at some frequency, determines a location of the shopping cart using response signal(s) received from one or more external wireless devices (e.g., as described in step 710). Between location determinations using the response signal(s), the shopping cart can track its location with the wheel motion data (e.g., as described in steps 720, 730, and 740). In one or more embodiments, the shopping cart can perform some correction through fusing the location determination using the response signal(s) from external wireless device(s) and the location determination using the wheel motion data. For example, the shopping cart can calculate an average (e.g., a weighted average) between the location determined based on the response signal(s) and the location determined based on the wheel motion data. In other examples, the shopping cart can calibrate the wheel sensors based on a difference between the location determined based on the response signal(s) and the location determined based on the wheel motion data, with the location determined based on the response signal(s) serving as a baseline location.

In other embodiments, the shopping cart can calibrate the wheel sensors using other mechanisms to determine ground truth location. For example, the shopping cart can incorporate an imaging device located either on the shopping cart or elsewhere in the indoor environment that is able to detect the shopping cart is at a particular location. For example, visual features (e.g., QR codes) can be placed at a fixed location in the indoor shopping environment. As a camera on the shopping cart captures an image of the visual features, the shopping cart can positively identify the shopping cart to be located at the fixed location in the indoor shopping environment. Alternatively or additionally, an imaging device or camera is placed at a fixed location in the indoor environment (e.g., at an entrance) and can capture an image of the shopping cart to determine that the shopping cart is at the fixed location. Other sensors capable of detecting the presence of the shopping cart may likewise be used to determine the ground truth location.

The shopping cart updates 750 a map with the location of the shopping cart. The shopping cart may also update its location on its locally-stored map of the indoor environment, while periodically synchronizing with the online map. As the shopping cart self-tracks its location throughout the indoor environment, the shopping cart can periodically (e.g., at some frequency) update the online map hosted by an online system (e.g., the automated checkout system). Each map may include a floorplan of the indoor environment with real-time locations of one or more of the shopping carts. The shopping cart updates the locally-stored map and/or the online map based on locations determined based on signals from external wireless devices and based on translations determined based on wheel motion data.

The shopping cart may provide 760 location-based content on the display of the shopping cart. As the user is traveling throughout the store, the shopping cart's self-tracking can inform content to be provided via the display. In one example implementation, a user selects a recipe or uploads a grocery list with a list of ingredients needed. Based on its self-tracked location, the shopping cart may provide navigational instructions via the display to direct the user to the locations of the needed ingredients. In another example implementation, a user is located in one aisle of the store, and the shopping cart may provide a preview of content items located in that aisle (e.g., "Aisle 8 contains crackers, cookies, cereal, syrups, chips, and other snack items."). The content may be provided via an online database, e.g., that is tailored based on the location.

Figure 8A:
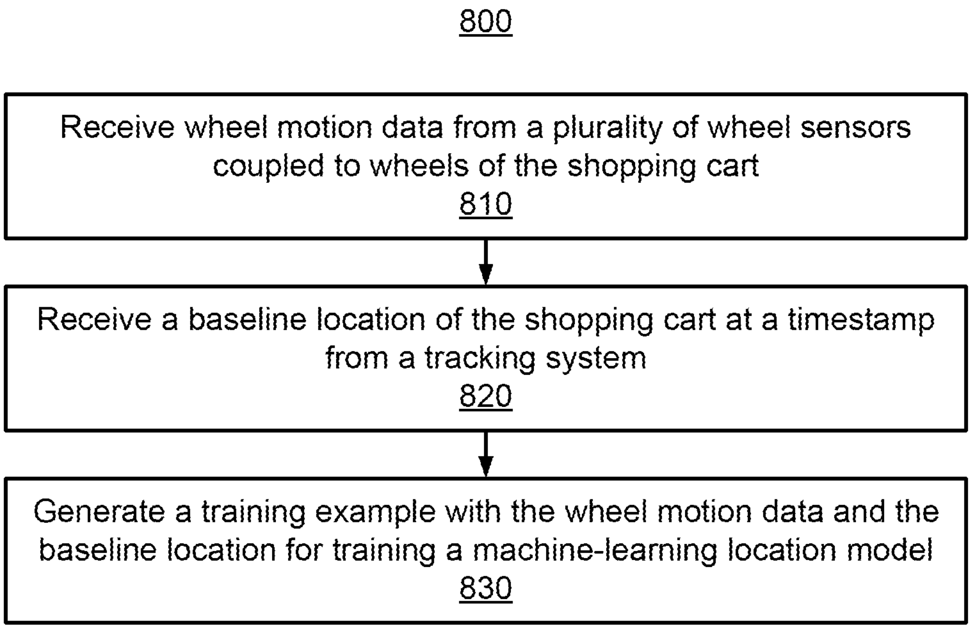
FIG. 8A is a flowchart illustrating an example method of generating a training example with wheel motion data for training a machine-learning location model, in accordance with some embodiments.

FIG. 8A is a flowchart illustrating an example method 800 of generating a training example with wheel motion data for training a machine-learning location model, in accordance with some embodiments. Although the following description is in the perspective of the shopping cart (e.g., the shopping cart 120) performing the method 800, other components such as the automated checkout system 100, the client device 130, or any other system in communication with the shopping cart via the network 110 may perform some or all of the steps in the method 800. Moreover, the tracking system 190 of the shopping cart may perform the method 800.

The shopping cart receives 810 wheel motion data from a plurality of wheel sensors coupled to the plurality of wheels of the shopping cart. The wheel motion data comprises at least wheel rotation and may further comprise wheel orientation. Utilizing wheel motion data for each of the plurality of wheels provides multiple streams of data that can ensure accurate prediction of the shopping cart's location, even if one wheel's wheel motion data is noisy, e.g., due to some artifact inhibiting rotation or change in orientation of the wheel.

The shopping cart receives 820 a baseline location of the shopping cart at a timestamp. The baseline location may be determined in any number of various manners. For example, in some embodiments, the shopping cart determines the baseline location using response signal(s) received from external wireless device(s), e.g., as described in FIG. 4. In other embodiments, the shopping cart can determine the baseline location imaging devices, e.g., as described in the method 700 of FIG. 7. Utilizing the baseline locations as determined based on signals received from the external wireless device(s) allows for ease of generating training examples from normal use for the machine-learning location model.

The shopping cart generates 830 a training example with the wheel motion data and the baseline location for training a machine-learning location model. The training example includes the wheel motion data and the baseline location. In other embodiments, the training examples include the wheel motion data and a baseline translation of the shopping cart during the time segment of the wheel motion data. The baseline translation may be calculated based on knowing the initial baseline location and the end baseline location of the shopping cart over the time segment. In some embodiments, the wheel motion data is partitioned using a time window.

For example, the wheel motion data is partitioned into 30 second segments. The shopping cart may receive a baseline location every 30 seconds. The shopping cart then pairs a 30-second segment of the wheel motion data to a baseline location with timestamp overlapping the segments. The timestamp may align with an end of the time segments. In one or more embodiments, the shopping cart may determine an estimated location using the wheel motion data from a first baseline location, e.g., as described in the method 700 of FIG. 7. In other embodiments, the training examples include the wheel motion data and a baseline translation of the shopping cart during the time segment of the wheel motion data. The baseline translation may be calculated based on knowing the initial baseline location and the end baseline location of the shopping cart over the time segment. In some embodiments, the wheel motion data is partitioned using a time window. The training example may further comprise the estimated location, via the method 700.

Figure 8B:
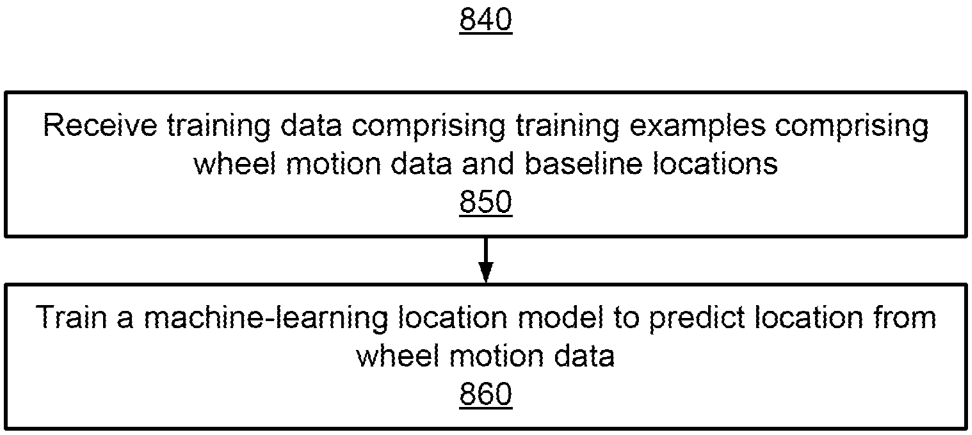
FIG. 8B is a flowchart illustrating an example method of training a machine-learning location model, in accordance with some embodiments.

FIG. 8B is a flowchart illustrating an example method 840 of training a machine-learning location model, in accordance with some embodiments. Although the following description is in the perspective of the shopping cart (e.g., the shopping cart 120) performing the method 840, other components such as the automated checkout system 100, the client device 130, or any other system in communication with the shopping cart via the network 110 may perform some or all of the steps in the method 840. Moreover, the tracking system 190 of the shopping cart may perform the method 840.

The shopping cart receives 850 training data comprising training examples comprising wheel motion data and baseline locations. The training examples may be generated via the method 800 of FIG. 8A. In one or more embodiments, the training data has a common characteristic. For example, the training data may be derived from shopping carts from one location. In another example, the training data may be derived from a single shopping cart. Based on the characteristics of the training data, the machine-learning location model may be specific to the one or more characteristics. The training data may further comprise other sensor data used as features to the machine-learning location model. For example, other sensor data may include one or more images as captured by an imaging device, movement data (e.g., translational velocity, translational acceleration, rotational velocity, rotational acceleration, etc.) as measured by an accelerometer or inertial measurement unit, data from a magnetometer, and data from an inclinometer, etc.

The shopping cart trains 860 the machine-learning location model with the training data, where the location model predicts location of a shopping cart based on input wheel motion data. Generally, the machine-learning location model may be trained through adjusting weights of the model to accurately predict location from the input data (e.g., the wheel motion data, other sensor data, or some combination thereof). Generally, the shopping cart trains the machine-learning location model by applying the model to wheel motion data from a training example to generate a translation prediction, and then compares the translation prediction to the translation label. The shopping cart updates the model based on the comparison. For example, the shopping cart may use backpropagation of a prediction while adjusting weights of the model to minimize a loss function that calculates a loss between the baseline location and the location predicted by the location model.

In some embodiments, the machine-learning location model may be trained for a particular shopping cart, and retrained periodically (e.g., every month, every 6 months, every year, etc.). Retraining of the location model continually refines the location model as the shopping cart's wheels may undergo physical changes (e.g., gum getting stuck in a wheel, wheel coming loose, hair getting caught in wheel, wheel losing lubricant, etc.). Retraining of the location model can automatically relearn weights assigned to each wheel's wheel motion data, e.g., discounting a wheel that is fully stuck and no longer rotates. The trained location model may further inform whether one wheel's rotation data is out of sync, e.g., requires maintenance.

In some embodiments, the location model predicts a translation of the shopping cart from a prior location to determine the present location. The shopping cart (e.g., via the tracking system) may determine the prior location through one or more approaches. For example, the shopping cart may utilize a wireless device to receive signals from external wireless device(s) placed in the indoor environment (e.g., as described in FIGS. 4 and 7). In other examples, the shopping cart may utilize imaging devices (e.g., as described in FIG. 7) to determine the prior location.

In some embodiments, the location model may comprise two sub-models. A first sub-model calculates a translation based on the wheel motion data, e.g., as described in step 730 in FIG. 7. A second sub-model is a machine-learning model that predicts a drift correction based on the training data (e.g., the wheel rotation data). For example, a particular shopping cart's wheels are stickier than when manufactured, causing the wheels to skid rather than rotate while the shopping cart translates. The drift correction for a shopping cart can determine that each rotation may correspond rather to 1.2 times the default translation. Location drift may be calculated as a difference from the location as estimated based on the wheel motion data, e.g., as described in step 740 of FIG. 7, and the baseline location, as received in step 820 of FIG. 8A. The shopping cart may train the second sub-model to correct for location drift based on the location drift in the training examples. Together, the two sub-models predict location with the first sub-model providing a calculated translation and the second sub-model providing a drift correction, where the calculated translation and the drift correction determine the location of the shopping cart.

In some embodiments, supervised machine learning may include methods of training of models with training data that are associated with labels. Techniques in supervised machine learning may include methods that can classify a series of related or seemingly unrelated inputs into one or more output classes. Output labels are typically used to train the learning models to the desired output, such as location.

In some embodiments, unsupervised machine learning may include methods of training of models with training data without the need for training labels (which are often obtained from experts, computationally, or crowd sourced). Techniques in unsupervised machine learning may include cluster analysis that may be used to identify internal links between data (regardless of whether data is labeled or unlabeled). Another technique is to use autoencoders, to featurize and compress data (e.g., the wheel motion data). Autoencoders are sometimes described as 'self-supervised' since the model input and output are the same.

In deep learning, neural networks are implemented comprising one or more deep layers. The neural networks may also include convolutional layers, recurrent layers, dense layers, pooling layers, activation layers, or a combination of different layers. Neural networks can extract relevant features from raw or minimally processed input data to map input data to output data. Convolutional layers are particularly well suited to extract local spatial or time dependent features. Convolutional layers can be 1D, 2D or 3D layers to process different input types. Dense layers are particularly well suited to extract global features. Recurrent layers (e.g. LSTM, GRU) are a specific type of layers that are designed to extract temporal features. In these feature extraction layers, the weights in the layers are adjusted such that the most relevant features are extracted. The process of optimizing the weights is performed by minimizing loss functions that compare the predicted output with the true output. Different optimization techniques can be used to minimize the loss function, including but not limited to stochastic gradient descent, RMSprop, Adam, Adadelta, Adagrad, or Adamax. Other layers can be used such as activation layers (e.g. ReLU, Sigmoid, or others), pooling (max, average, or others), normalization, regularization (e.g. dropout), attention, reshaping, merging, and locally connected layers can be also be use separately or in combination. Other machine-learning models include Naïve Bayes classification, linear regression, K nearest neighbor, support vector machines, decision trees, and random forests.

Figure 9:
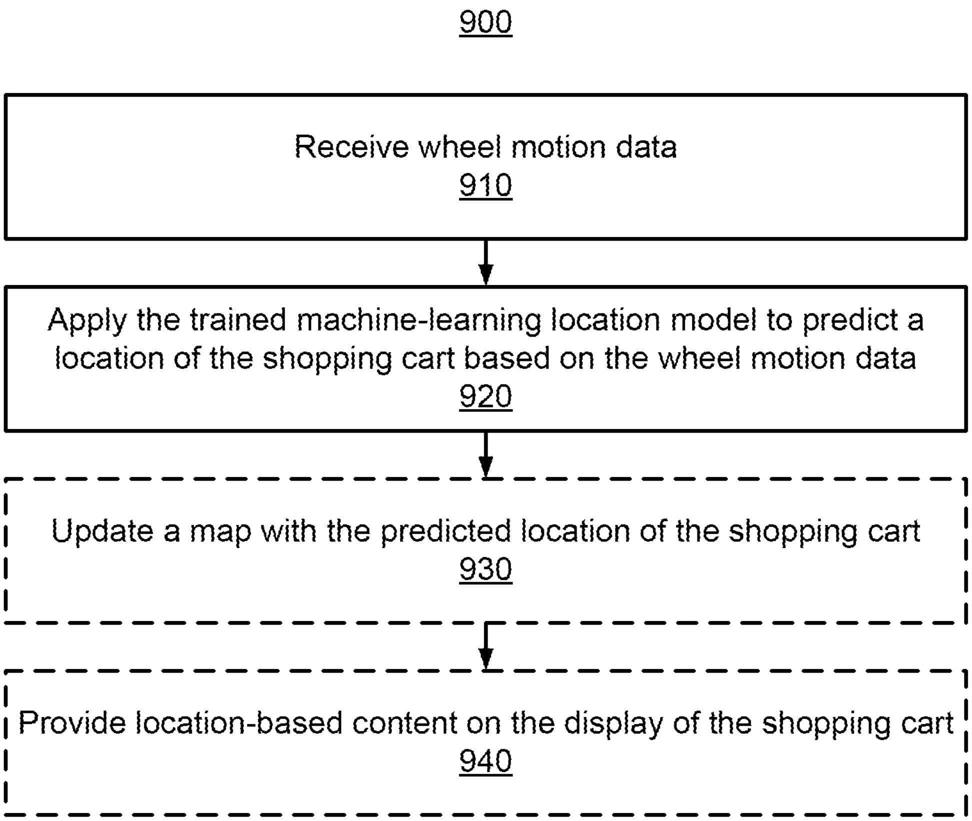
FIG. 9 is a flowchart illustrating an example method of self-tracking by a shopping cart by applying a machine-learning location model, in accordance with some embodiments.

FIG. 9 is a flowchart illustrating an example method 900 of self-tracking by a shopping cart by applying a machine-learning location model, in accordance with some embodiments. Although the following description is in the perspective of the shopping cart (e.g., the shopping cart 120) performing the method 900, other components such as the automated checkout system 100, the client device 130, or any other system in communication with the shopping cart via the network 110 may perform some or all of the steps in the method 900. Moreover, the tracking system 190 of the shopping cart may perform the method 900.

The shopping cart receives 910 wheel motion data from the wheel sensor(s). The wheel motion data describes wheel rotation and wheel orientation. The wheel motion data may describe wheel rotation and wheel orientation for each of the wheels, or a subset of the wheels.

The shopping cart applies 920 the trained machine-learning location model to predict a location of the shopping cart based on the wheel motion data. In one or more embodiments, the location model may be tailored to the shopping cart. The location predicted may be relative location, e.g., in relation to another most recently determined location, or global location, e.g., a position in the indoor environment. In one or more implementations, the shopping cart 920 periodically calculates translation via the machine-learning location model and continually updates a location of the shopping cart from a prior baseline location. The shopping cart 920 can continue to sum calculated translations to determine its real-time location in reference to the prior baseline location.

The shopping cart updates 930 a map with the predicted location of the shopping cart. The map may be locally stored or stored on an online system. The shopping cart may also update its location on its locally-stored map of the indoor environment, while periodically synchronizing with the online map. Akin to step 750 of FIG. 7, the shopping cart may self-track and periodically provide updated location to the online map, which tracks movement of the shopping cart (e.g., in the online cloud).

The shopping cart provides 940 location-based content on the display of the shopping cart. As the user is traveling throughout the store, the shopping cart's self-tracking can inform content to be provided via the display. Akin to step 760 of FIG. 7, the content may be provided by an online database that is selected based on the real-time location of the shopping cart.

Example Method for Establishing Sessions Between Users and Shopping Carts

Figure 10:
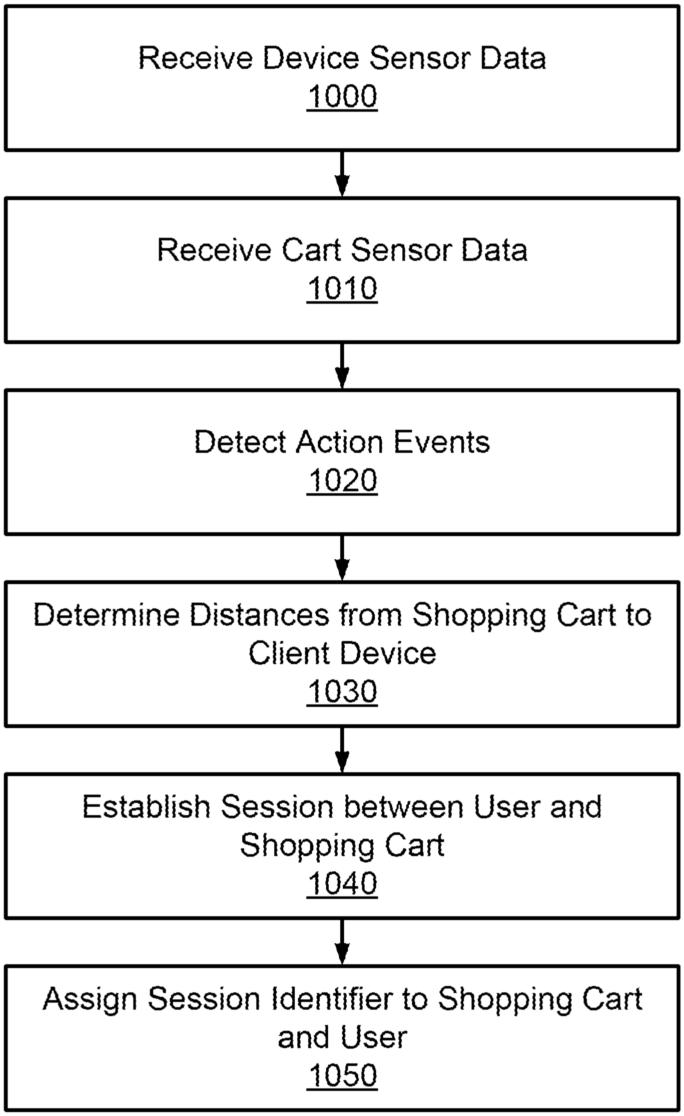
FIG. 10 is a flowchart illustrating an example method of establishing sessions between users and shopping carts, in accordance with some embodiments.

FIG. 10 is a flowchart illustrating an example method for establishing sessions between users and shopping carts, in accordance with some embodiments. Alternative embodiments may include more, fewer, or different steps and the steps may be performed in a different order from that illustrated in FIG. 10. Additionally, the method illustrated by FIG. 10 may be performed by the automated checkout system 100 illustrated in FIG. 1.

The automated checkout system receives 1000 device sensor data from a first set of sensors. The device sensor data describes a set of measurements of a client device by the first set of sensors. The automated checkout system receives 1010 cart sensor data from a second set of sensors. The cart sensor data describe a set of measurements of a shopping cart by the second set of sensors.

The automated checkout system detects 1020 one or more action events based on the cart sensor data. Each action event indicates an action that has been taken with respect to the shopping cart. For example, an action event may include an item added to the shopping cart, the shopping cart being moved, or an interaction with a display of the shopping cart. Each action event also may be associated with a timestamp that indicates when the action event occurred.

The automated checkout system determines 1030 one or more distances of the client device from the shopping cart. Each distance may be determined at one of the timestamps of an action event; in other words, the automated checkout system may determine the distance of the client device from the shopping cart at each timestamp when the automated checkout system detects an action event. The automated checkout system may determine the one or more distances based on the device sensor data and the cart sensor data.

The automated checkout system establishes 1040 a session between the user corresponding to the client device and the shopping cart. The session may associate future actions taken with regards to the shopping cart while the session exists with the user. The automated checkout system may establish the session by correlating the one or more distances with the one or more action events. For example, the automated checkout system may determine whether the action events are more likely to occur when the client device is within a threshold distance of the client device. If so, the automated checkout system may establish a session because the action events and the distances are correlated.

The automated checkout system assigns 1050 a unique session identifier for the established session in a session database. The automated checkout system may create a new session identifier for the established session, and may associate the session identifier with an identifier for the user and an identifier for the shopping cart. The automated checkout system may thereby use the session identifier to associate additional actions taken with regards to the shopping cart with the user.

Other Considerations

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A computer-program product comprising a non-transitory computer-readable storage medium storing a machine-learning location model for tracking a shopping cart in an indoor environment, wherein the product is made by:

receiving training wheel motion data from a plurality of wheel sensors coupled to a plurality of wheels on a shopping cart;

partitioning the training wheel motion data into a plurality of segments using a time window;

receiving ground truth locations of the shopping cart determined by one or more signals from one or more external wireless devices in the indoor environment;

generating one or more training examples, each training example comprising a segment of training wheel motion data and a corresponding ground truth location of the shopping cart;

training the machine-learning location model with the training examples, wherein the machine-learning location model is trained to predict a translation of the shopping cart based on subsequent wheel motion data to output an estimated location of the shopping cart, wherein the translation includes a direction and a distance traveled; and updating the trained machine-learning location model on the non-transitory computer-readable-storage medium.

2. The computer-program product of claim 1, wherein the non-transitory computer-readable storage medium further stores instructions that, when executed by a computer processor, cause the computer processor to perform operations comprising:

detecting, by a wireless device located on the shopping cart, one or more subsequent signals from the one or more external wireless devices in the indoor environment;

determining a first baseline location of the shopping cart at a first timestamp based on the detected one or more subsequent signals from the one or more external wireless devices in the indoor environment;

receiving the subsequent wheel motion data from the plurality of wheel sensors coupled to the plurality of wheels of the shopping cart, wherein the subsequent wheel motion data describes rotation of the one or more wheels and orientation of the one or more wheels;

predicting an estimated location of the shopping cart at a second timestamp by applying the machine-learning location model to the subsequent wheel motion data; and updating a map with the estimated location of the shopping cart.

3. The computer-program product of claim 2, wherein predicting the estimated location of the shopping cart at the second timestamp comprises applying the machine-learning location model to the subsequent wheel motion data and further to the first baseline location of the shopping cart at the first timestamp.

4. The computer-program product of claim 2, wherein predicting the estimated location of the shopping cart at the second timestamp by applying the machine-learning location model to the subsequent wheel motion data comprises:

predicting the translation of the shopping cart by applying the machine-learning location model to the subsequent wheel motion data; and determining the estimated location based on the translation of the shopping cart from the first baseline location.

5. The computer-program product of claim 2, the operations further comprising:

receiving acceleration data from an accelerometer describing acceleration of the shopping cart; and wherein the machine-learning location model further inputs the acceleration data in predicting the estimated location.

6. The computer-program product of claim 2, the operations further comprising:

displaying, on a display on the shopping cart, the estimated location of the shopping cart.

7. The computer-program product of claim 2, the operations further comprising:

displaying, on a display of the shopping cart, content based on the estimated location of the shopping cart.

8. The computer-program product of claim 1, wherein the machine-learning location model comprises two sub-models:

a first sub-model calculates the translation of the shopping cart based on the subsequent wheel motion data; and a second sub-model calculates a drift correction, wherein the estimated location is based on the translation of the shopping cart and the drift correction.

9. A method of tracking a shopping cart in an indoor environment comprising:

determining a first baseline location of the shopping cart at a first timestamp with a wireless device located on the shopping cart detecting one or more external wireless devices in the indoor environment;

receiving wheel motion data from a plurality of wheel sensors coupled to a plurality of wheels of the shopping cart, wherein the wheel motion data describes rotation of the plurality of wheels and orientation of the plurality of wheels;

predicting an estimated location of the shopping cart at a second timestamp by applying a machine-learning location model to the wheel motion data, wherein the machine-learning location model is trained by:

receiving prior wheel motion data from the plurality of wheel sensors, partitioning the prior wheel motion data into a plurality of segments using a time window, receiving ground truth locations of the shopping cart determined by one or more signals from one or more external wireless devices in the indoor environment, generating one or more training examples, each training example comprising a segment of prior wheel motion data and a corresponding ground truth location of the shopping cart, training the machine-learning location model with the training examples, wherein the machine-learning location model is trained to predict a translation of the shopping cart based on the wheel motion data to output an estimated location of the shopping cart, wherein the translation includes a direction and a distance traveled; and updating a map with the estimated location of the shopping cart.

10. The method of claim 9, wherein predicting the estimated location of the shopping cart at the second timestamp comprises applying the machine-learning location model to the wheel motion data and further to the first baseline location of the shopping cart at the first timestamp.

11. The method of claim 9, wherein predicting the location of the shopping cart by applying the machine-learning location model to the wheel motion data comprises:

predicting the translation of the shopping cart by applying the machine-learning location model to the wheel motion data; and determining the location based on the translation of the shopping cart from the first baseline location.

12. The method of claim 11, wherein predicting the translation of the shopping cart comprises predicting a direction traveled and a distance traveled by the shopping cart within a timeframe.

13. The method of claim 9, wherein the machine-learning location model comprises two sub-models:

a first sub-model calculates the translation of the shopping cart based on the wheel motion data; and a second sub-model calculates a drift correction, wherein the estimated location is based on the translation of the shopping cart and the drift correction.

14. The method of claim 9, wherein the rotation of each wheel is about an axis that is parallel to a ground, and wherein the orientation of each wheel is about an axis that is orthogonal to the ground.

15. The method of claim 9, further comprising:

receiving acceleration data from an accelerometer describing acceleration of the shopping cart; and wherein the machine-learning location model further inputs the acceleration data in predicting the location.

16. The method of claim 9, further comprising:

displaying, on a display on the shopping cart, the estimated location of the shopping cart.

17. The method of claim 9, further comprising:

displaying, on a display on the shopping cart, content based on the estimated location of the shopping cart.

18. The method of claim 9, wherein the plurality of wheels comprises at least two wheels, and wherein the wheel motion data describes rotation of the two wheels and orientation of the two wheels.

19. A system comprising:

a computer processor; and a computer-readable storage medium storing instructions that, when executed by the computer processor, cause the computer processor to perform operations comprising:

determining a first baseline location of a shopping cart at a first timestamp with a wireless device located on the shopping cart detecting one or more external wireless devices in an indoor environment;

receiving wheel motion data from a plurality of wheel sensors coupled to a plurality of wheels of the shopping cart, wherein the wheel motion data describes rotation of the plurality of wheels and orientation of the plurality of wheels;

predicting an estimated location of the shopping cart by applying a machine-learning location model to the wheel motion data, wherein the machine-learning location model is trained by:

receiving prior wheel motion data from the plurality of wheel sensors, partitioning the prior wheel motion data into a plurality of segments using a time window, receiving ground truth locations of the shopping cart determined by one or more signals from the one or more external wireless devices in the indoor environment, generating one or more training examples, each training example comprising a segment of prior wheel motion data and a corresponding ground truth location of the shopping cart, training the machine-learning location model with the training examples, wherein the machine-learning location model is trained to predict a translation of the shopping cart based on the wheel motion data to output an estimated location of the shopping cart, wherein the translation includes a direction and a distance traveled; and updating a map with the estimated location of the shopping cart.

* * * * *